United States Patent
Spencer, IV

(10) Patent No.: US 9,369,395 B2
(45) Date of Patent: Jun. 14, 2016

(54) METHODS AND APPARATUS TO NEGOTIATE FLOW CONTROL FOR A COMMUNICATION SESSION

(75) Inventor: Thomas Spencer, IV, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 63 days.

(21) Appl. No.: 13/601,779

(22) Filed: Aug. 31, 2012

(65) Prior Publication Data

US 2014/0068087 A1 Mar. 6, 2014

(51) Int. Cl.
*G06F 15/16* (2006.01)
*H04L 12/825* (2013.01)
*H04L 29/06* (2006.01)

(52) U.S. Cl.
CPC ............... *H04L 47/26* (2013.01); *H04L 69/24* (2013.01)

(58) Field of Classification Search
USPC ................................................ 709/227, 200
See application file for complete search history.

(56) References Cited

U.S. PATENT DOCUMENTS

| | | | |
|---|---|---|---|
| 5,528,589 A * | 6/1996 | Nishidai | 370/235 |
| 6,603,975 B1 | 8/2003 | Inouchi et al. | |
| 7,047,310 B2 | 5/2006 | Bedekar et al. | |
| 7,558,872 B1 * | 7/2009 | Senevirathne et al. | 709/234 |
| 8,004,981 B2 | 8/2011 | Bergamasco et al. | |
| 8,018,955 B2 | 9/2011 | Agarwal et al. | |
| 2007/0253441 A1 * | 11/2007 | Curran-Gray et al. | 370/464 |
| 2011/0110397 A1 * | 5/2011 | Mochizuki et al. | 375/130 |
| 2012/0102016 A1 * | 4/2012 | Balogh | 707/706 |
| 2012/0311337 A1 * | 12/2012 | Wuschek et al. | 713/176 |

OTHER PUBLICATIONS

"Autonegotiation", http://en.wikipedia.org/wiki/Autonegotiation, retrieved May 23, 2012, 7 pages.
CIJO, "Auto Negotiation and Flow Control", http://opticaltecharticles.blogspot.com/2006/09/auto-negotiation-and-flow-control.html, Sep. 4, 2006, retrieved May 23, 2012, 3 pages, Banglore, Karnataka, India.
"Ethernet Auto-Negotiation", 6 pages, N-Tron, The Industrial Network Company, Mobile, AL.
"Transmission Control Protocol", http://en.wikipedia.org/wiki/Transmission_Control_Protocol, retrieved May 23, 2012, 22 pages.

* cited by examiner

*Primary Examiner* — El Hadji Sall
(74) *Attorney, Agent, or Firm* — Hanley, Flight & Zimmerman, LLC

(57) ABSTRACT

Methods and apparatus are disclosed to negotiate flow control for a communication session. Example methods disclosed herein include sending, via the communication session, a request to a peer to change a flow control mechanism for the communication session, receiving, via a communication session, a reply from the peer, the reply indicating whether the request to change the flow control mechanism for the communication session has been accepted, and performing subsequent flow control for the communication session based on the reply.

19 Claims, 7 Drawing Sheets

METHODS AND APPARATUS TO NEGOTIATE FLOW CONTROL FOR A COMMUNICATION SESSION

FIELD OF THE DISCLOSURE

This disclosure relates generally to communication sessions, and, more particularly, to methods and apparatus to negotiate flow control for a communication.

BACKGROUND

Flow control mechanisms are used in data communications to manage the rate of data transmissions between communication devices, or, more generally, communicating peers. Such mechanisms control the rate of data so that a transmitting peer does not send such a substantial amount of data that the receiving peer is unable to process or receive the entire amount of transmitted data. The amount of data that a peer can receive and/or transmit can vary among peers based on, for example, the processing power of the peer, the network environment within which each peer operates, etc. For example, when one of a pair of communicating peers moves into a different network environment, at least one of the peers may change the flow control mechanism of the communication session to adjust to the new network environment.

DETAILED DESCRIPTION

Figure 1:
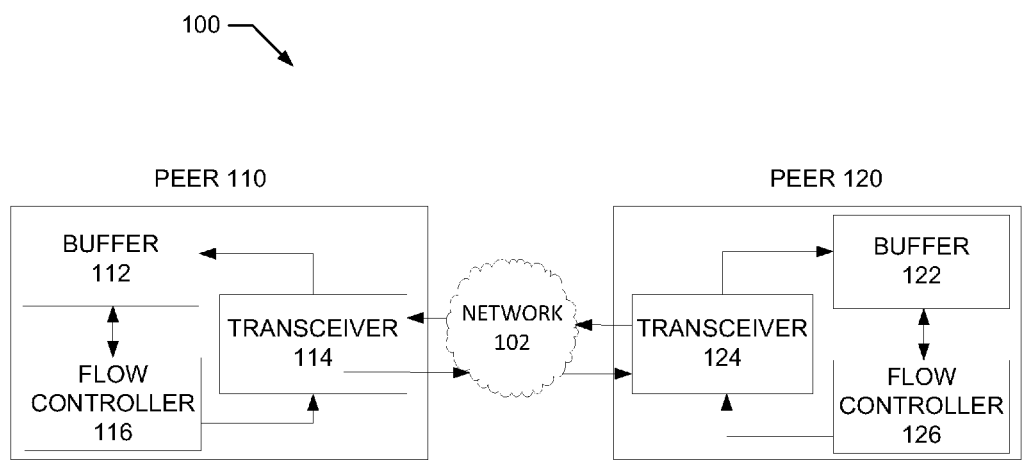
FIG. 1 is a block diagram of an example data communication system constructed in accordance with the teachings of this disclosure and including two example peer devices capable of negotiating flow control for a communication session.

Several types of flow control mechanisms have been implemented to increase or decrease or, more generally, manage the flow of data in communication sessions between communication devices. For example, Transmission Control Protocol (TCP) uses a "sliding window" flow control mechanism, in which the size of the window can be adjusted based on the available space that a communication device has for processing data. Other flow control mechanisms include, but are not limited to, negative acknowledgement (NACK) and stream. In prior communication systems employing prior communication protocols, the flow control mechanism used within a given communication session is determined by the communication protocol used to establish the communication session. Therefore, in such prior techniques, for peers to change flow control mechanisms, a new or separate communication session had to be set up with an appropriate communication protocol supporting the new flow control mechanism.

Methods and apparatus to negotiate flow control for a communication session are disclosed herein. Example methods disclosed herein for negotiation of flow control for a communication session include sending, via the communication session, a request to a peer to change the flow control behavior used for the communication session. Such example methods also include determining whether that request has been accepted by the peer based on a reply from the peer. Such example methods further include performing subsequent communication with the peer based on the reply.

In some examples, the request is sent via the communication session and may be an operations, administrations, and management message (OAM) with a payload including a flow control mechanism identifier, a sequence number, a request identification, etc. In some examples, the reply is also an OAM message with a payload including a flow control mechanism identifier, a last valid sequence number, a request identification, etc. In some examples, the communication session continues regardless of the acceptance of the request by the peer. In some examples, whether the flow control mechanism is changed for that communication session depends on whether the peer accepts, via that communication session, the request that was received via the communication session.

Other example methods disclosed herein include receiving a request from a peer to change the flow control for a communication session. Such example methods also include determining whether the request can be accepted and sending a reply indicating whether or not the request is accepted. Such example methods further include performing subsequent flow control in accordance with the reply. In some examples, the request is an OAM message having a payload including a flow control mechanism identifier, a sequence number, a request identifier, etc. The request may be received via the communication session. In some examples, determining whether the request can be accepted may be based on a number of characteristics, such as the network environment in which the peers are operating, the processing speed of one or both of the peers, the data rate of the communication session, etc. In some examples, the reply is sent via the communication session and is an OAM message including a payload with a flow control mechanism identifier, a last valid sequence number, a request identification, etc. In some examples, when the reply message contents are the same as, or equivalent to, the contents included in the request message, the reply message is deemed to indicate that the request has been accepted and the flow control mechanism can be changed for the communication session. In some examples, following transmission of the reply, the communication session continues with subsequent flow control in accordance with the reply.

Disclosed example methods, apparatus, and articles of manufacture enable two peers (e.g. communication devices) to negotiate flow control via an existing communication session without having to begin a new communication session. In some examples, negotiation takes place during set up of the communication session or anytime during the communication session, with negotiation taking place via the communication session. Such disclosed example methods, apparatus, and articles of manufacture allow communication devices to negotiate flow control via a single communication session, whereas previous techniques have used multiple communication sessions. As network performance changes (such as when a communication device moves between network segments), device applications can adjust or alter the flow control mechanism using an OAM message sent in-band via the communication session. Additional flow control mechanisms may be introduced without the introduction of another communication protocol. As the needs of a communication device application change, so too can the flow control mechanism of the underlying communication session.

Turning to the figures, a block diagram of an example communication system 100 capable of negotiating flow control for a communication session as disclosed herein is illustrated in FIG. 1. The system 100 of the illustrated example includes an example network 102, a first example peer device 110, and a second example peer device 120. The example network 102 includes, for example, one or more of, the Internet, an intranet, a local area network (LAN), a wide area network (WAN), etc.

The peer 110 and the peer 120 of the illustrated example are each implemented by any network element capable of transmitting or receiving data with another network element. For example, the peer 110 may be an endpoint while the peer 120 may be an access point. As another example, each of the peer 110 and the peer 120 may be a respective communication endpoint.

The example peer 110 includes an example buffer 112, an example transceiver 114, and an example flow controller 116. The example peer 120 also includes an example buffer 122, an example transceiver 124, and an example flow controller 126. In the example of FIG. 1, the peer 110 communicates with the peer 120 through the network 102. The network 102 may also communicatively link the peer 110 and the peer 120 with other elements. In the illustrated example, the peers 110, 120 send and receive messages through transceiver 114 and transceiver 124, respectively. The buffer 112 and the buffer 122 temporarily store data received by the respective peers 110, 120 for processing by the respective flow controllers 116, 126. The peers 110, 120 monitor and manage flow control using the respective flow controllers 116, 126.

In the illustrated example of FIG. 1, the peers 110, 120 monitor and manage the flow control for a communication session between the peers 110, 120 through the network 102 in accordance with example negotiation techniques disclosed herein. For example, a flow controller 116 of a requesting peer 110 may determine that it is desirable to change the flow control mechanism for an existing communication session with the remote peer 120. In some examples, a change to the flow control mechanism includes a change to the type of flow control (e.g. sliding window, negative acknowledgement (NACK), stream, etc.) or a change to one or more parameters of the flow control mechanism (size of data transmissions, timeouts, etc.).

In the illustrated example, if the peer 110 determines that a change to the flow control mechanism should be requested, the transceiver 114 of the peer 110 sends a flow control change request message via the communication session through the network 102 to the remote peer 120. The peer 120 then receives the message via its transceiver 124 and forwards the message to its buffer 122. The flow controller 126 of the peer 120 then references the message from the buffer 122 to determine whether the flow control change request can be accepted. The flow controller 126 forwards a reply message indicating whether the request is accepted to its transceiver 124. The peer 120 then transmits the reply message which indicates whether the request has been accepted, through the network 102 to the peer 110. In response, the peer 110 receives the reply message via the transceiver 114, and forwards the reply message to its buffer for processing by its flow controller 116. The flow controller 116 of the peer 110 then determines whether its prior flow control request has been accepted by the remote peer 120 and continues flow control of the communication session with the peer 120 based on the reply message.

Figure 2:
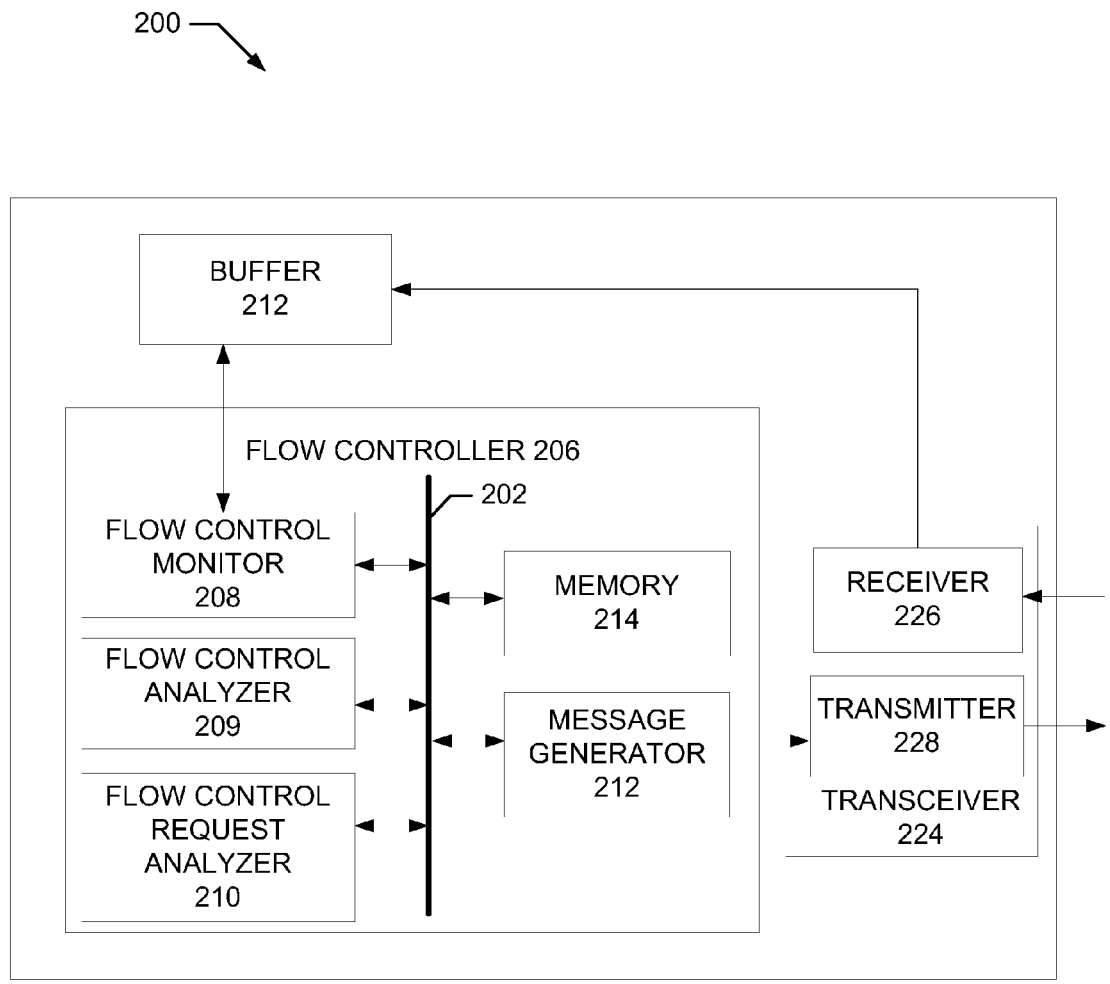
FIG. 2 is a block diagram of an example flow controller that may be used to implement one or both of the peers depicted in FIG. 1.

FIG. 2 illustrates an example peer device 200 that may be used to implement the peer device 110 and/or the peer device 120 of FIG. 1. The example peer device 200 of FIG. 2 includes an example flow controller 206, an example buffer 212, and an example transceiver 224. The example transceiver 224 includes an example receiver 226 and an example transmitter 228. The example flow controller 206 of FIG. 2 includes an example communication bus 202, an example flow control monitor 208, an example flow control analyzer 209, an example flow control request analyzer 210, an example flow control message generator 212, and an example flow controller memory 214. The communication bus 202 facilitates communication between the flow control monitor 208, the flow control analyzer 209, the flow control request analyzer 210, the flow control message generator 212, and the flow control memory 214.

During a communication session between the peer device 200 and another remote peer device, such as the remote peer 120 in the example of FIG. 1, the flow control monitor 208 of the illustrated example peer device 200 monitors the received data from the other peer, which is stored in the buffer 212, and the flow of data through the peer device 200 based on a current flow control mechanism. Any appropriate techniques for monitoring the data flow of the communication session may be employed by the flow control monitor 208; example monitoring techniques may monitor packet loss, delay, or any other characteristic of the data flow. The flow control monitor 208 in the illustrated example is capable of distinguishing between packet data flow of the communication session and flow control change request messages that are received via the same communication session. An example flow control change request message 300B is illustrated in FIG. 3B.

When the flow control monitor 208 in the illustrated example of the peer device 200 detects a flow control change request message received via the communication session, the flow control monitor 208 forwards the request to the flow control request analyzer 210, discussed below. In the illustrated example, when the flow control monitor 208 determines that a packet has been lost or has not been received within a time period (which may be specified as a configuration parameter, pre-configured, etc.), the flow control monitor 208 invokes the flow control analyzer 209. The example flow control analyzer 209 of the illustrated example then determines whether to request a change to the flow control mechanism for the current communication session. The flow control analyzer 209 may use any appropriate technique to determine which flow control parameter change and/or type of flow control mechanism is to be requested, such as analyzing network characteristics, data rate, throughput, etc., or any combination thereof.

In some examples, the flow control analyzer 209 analyzes which type of flow control (e.g. sliding window, NACK, stream, or other alternative mechanisms) or which parameters (size of data transmissions, timeouts, etc.) the peer device 200 should implement to improve speed, quality, efficiency, etc. In some examples, the example flow control analyzer 209 determines whether asymmetric flow control types should be requested for a current communication session. For example, the flow control analyzer 209 may determine that its flow controller 206 should use flow control mechanism A when receiving data and mechanism B when transmitting data, whereas a flow controller of a remote peer associated via the communication session should use mechanism B when receiving and mechanism A when transmitting. If the control analyzer 209 determines that peer device 200 should make a change to the flow control mechanism, the analyzer 209 instructs the message generator 212 to create a request message identifying the desired flow control mechanism.

Figure 3A:
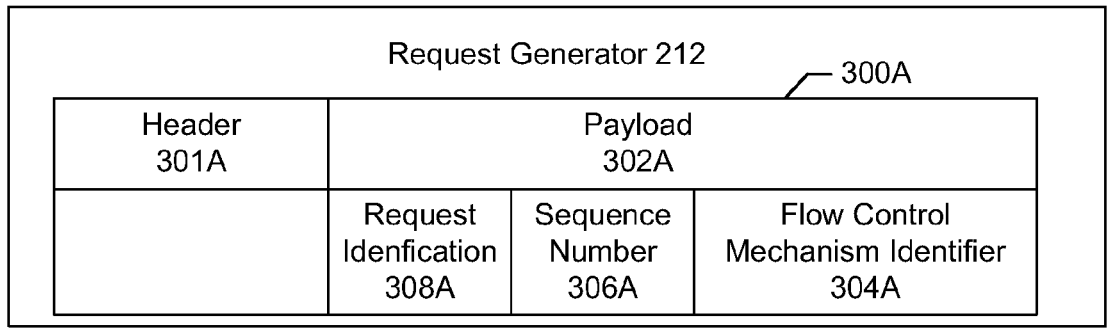
FIGS. 3A-3B illustrate examples of flow control change request messages that may be sent, received, stored and/or generated by the flow controller of FIG. 2.
Figure 3B:
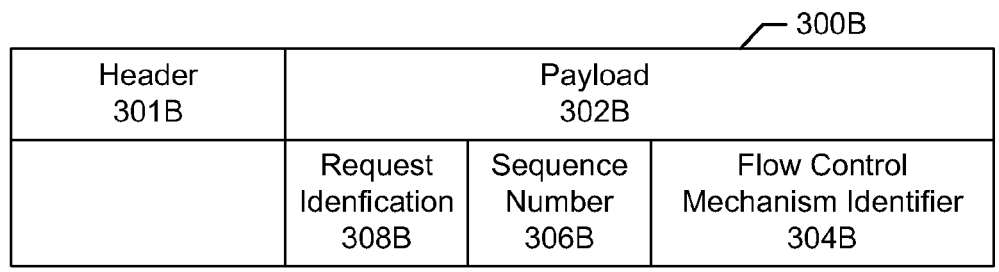

An example request message 300A generated by the message generator 212 of the peer device 200 of FIG. 2 is illustrated in FIG. 3A. The example request message 300A may be an operations, administrations, and management (OAM) message. The request message 300A of the illustrated example has an example header 301A and an example payload 302A. The payload 302A of the illustrated example includes an example flow control mechanism identifier 304A, an example sequence number 306A, and an example request identification 308A. In the illustrated example, the flow control mechanism identifier 304A indicates the desired type of flow control mechanism the peer device 200 is requesting to be implemented for the current communication session. The sequence number 306A of the illustrated example indicates the last valid sequence number of the data transmitted via the communication session. The request identification 308A of the illustrated example identifies the request with which the message 300A is associated.

Returning to the example of FIG. 2, the message generator 212 of the peer device 200 provides the request message 300A to both the transmitter 228 and the flow control memory 214. The transmitter 228 of the peer device 200 sends the request message 300A through a network, such as the example network 102, to the remote peer, via the communication session for which the indicated flow control change is being requested.

When the example flow control monitor 208 detects a flow control change request, such as the example request message 300B illustrated in FIG. 3B, received via the communication session from a remote peer in communication with the peer device 200, the flow control monitor 208 forwards the request 300B to the flow control request analyzer 210. In some examples, the flow control request analyzer 210 crosschecks the flow control memory 214 to determine if the peer 200 had previously transmitted and stored a request 300A with the same contents as request message 300B. In some examples, the request message 300B is considered to be a reply to the previously transmitted request message 300A. Accordingly, if the flow control request analyzer 210 determines that a request 300A having the same or similar contents (e.g. flow control mechanism identifier 304A, sequence number 306A, request identification 308A) as the contents of the request message 300B (e.g. flow control mechanism identifier 304B, sequence number 306B, request identification 308B) is stored in the memory 214, the request analyzer 210 of the illustrated example recognizes the message 300B as a reply message and notifies the flow control monitor 208 to change flow control mechanism and to monitor the flow control based on the flow control mechanism identifier 304B and/or 304A of the request messages 300B and/or 300A.

If the flow control request analyzer 210 does not recognize the request message 300B as a reply message from a remote peer, the flow control request analyzer 210 interacts with the flow control analyzer 209 to determine whether the request 300B can be accepted. The flow control analyzer 209 determines whether changing the flow control mechanism to that identified by the flow control mechanism identifier 304B of the request message 300B is acceptable. The example flow control analyzer 209 may use any technique to determine if the requested flow control mechanism identified by the flow control mechanism identifier 304B of the request message 300B may be employed by analyzing any network characteristic(s), such as data rate, throughput, etc.

If the flow control analyzer 209 of the illustrated example determines that the request 300B is acceptable, the request analyzer 210 notifies the flow control monitor 208 to change the flow control mechanism in accordance with the flow control mechanism identifier 304B of request message 300B. The flow control request analyzer 209 then instructs the message generator 212 to generate a reply message which indicates that the request has been accepted to be sent to the remote peer by the transmitter 228. In some examples, the flow control request analyzer 209 instructs the flow control message generator 212 to generate a reply message having the same contents as the request message 300B (e.g. flow control mechanism identifier 304B, sequence number 306B, request identification 308B) to indicate that the request 300B has been accepted.

If the example flow control analyzer 209 determines that the request 300B is not acceptable, the flow control analyzer 209 of the illustrated example notifies the flow control monitor 208 to continue monitoring flow control based on the flow control mechanism being used prior to receiving request message 300B and instructs the message generator 212 to send a reply indicating that the request message 300B has not been accepted. The transmitter 228 of peer device 200 then transmits the reply. In some examples, the flow control analyzer 209 instructs the message generator 212 to generate a reply message, wherein the contents of the reply message include a flow control identifier identifying the current flow control mechanism in use for the communication session, the same sequence number as the sequence number 306B, and the same request identification as the request identification 308B. This example reply message indicates to the remote peer of the communication session that the request was not accepted and that the flow control mechanism identified by flow control identifier of the reply message is still the current flow control mechanism used by the flow controller 206. In other examples, the reply message includes a flow control identifier which identifies a flow control mechanism other than the current flow control mechanism or the flow control mechanism being requested. In such examples, the reply message may act as both a reply which indicates that the request has been denied, and a request to change flow control mechanism that identified in the message.

Figure 4:
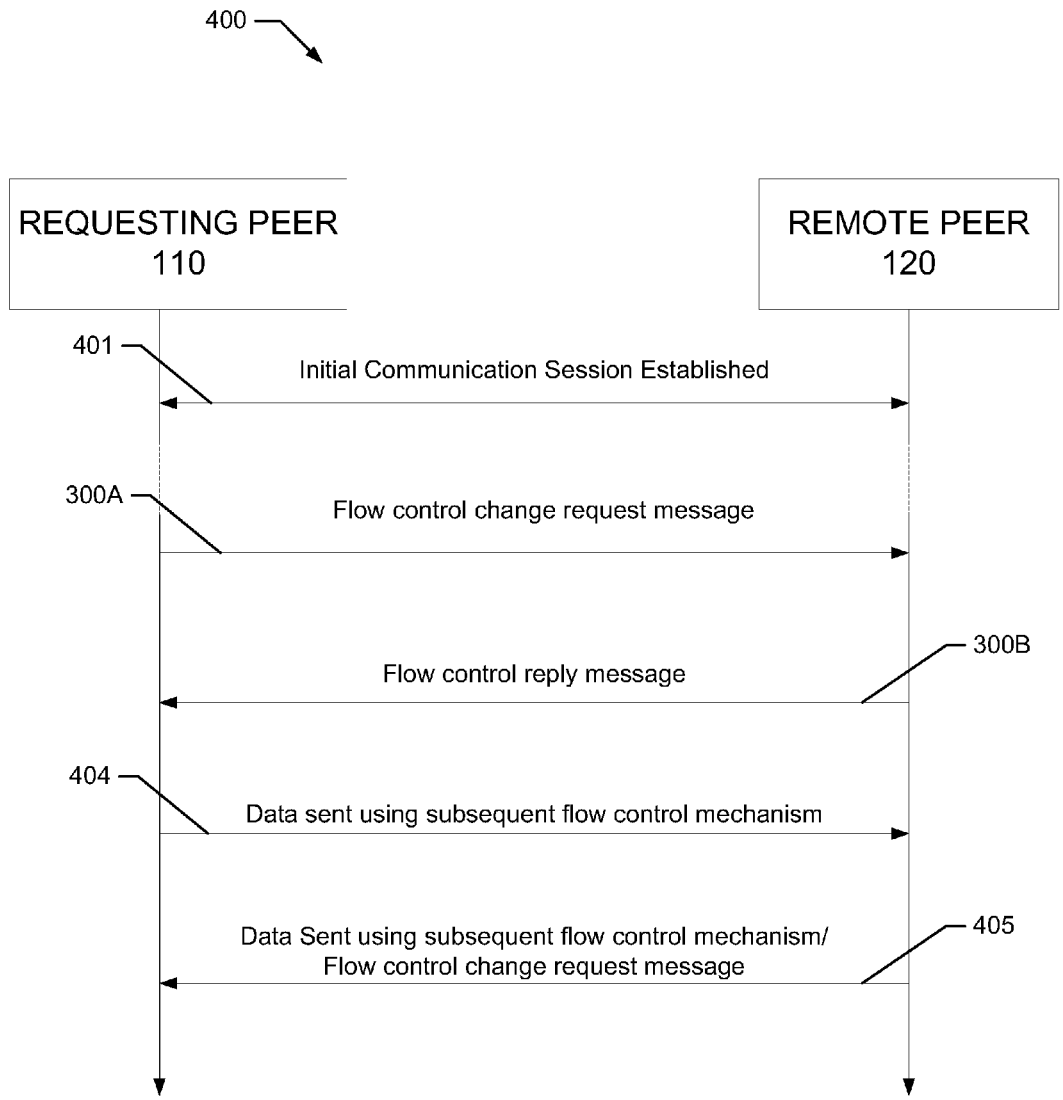
FIG. 4 is a message diagram showing an example flow control negotiation performed via a data communication session between the peers of FIG. 1.

A message diagram depicting a disclosed example flow control negotiation 400 for a communication session between the peer devices 110 and 120 of FIG. 1 is illustrated in FIG. 4. The example flow control negotiation 400 includes a set of messages that are exchanged between the two peer devices 110 and 120. In the illustrated example of FIG. 4, the peer 110 is referred to as the requesting peer device 110, and the peer device 120 is referred to as the remote peer device 120. In the illustrated example, the messages implementing the flow control negotiation sent via the communication session for which flow control is being performed and monitored.

The flow control negotiation 400 of FIG. 4 begins after a communication session has been initiated, which is represented by a bidirectional line 401. Either the requesting peer 110 or communicating peer 120 may initiate the communication session at any point in time. Any technique(s) or type(s) of message(s) (e.g. a session initialization protocol (SIP) message) may be used to begin the communication session between the peer devices 110 and 120.

Next, the requesting peer 110 of the illustrated example send a flow control change request message 300A to the remote peer device 100 to initiate flow control negotiation. The example message 300A of the example flow control negotiation 400 is sent via the communication session for which flow control is being negotiated. In the example flow control negotiation 400, the flow control analyzer 209 of the requesting peer 110 has determined that a change to the flow control (e.g. sliding window, NACK, stream, etc. or flow control parameters) is desirable. Therefore, the requesting peer 110 generates the flow control request message 300A in its message generator 212 and transmits the request message 300A to the remote peer 120.

Upon receipt of the message 300A, the remote peer 120 of the illustrated example determines whether the request to change the flow control indicated in the message 300A can be accepted. More specifically, when the message 300A is received, the flow control monitor 208 of the remote peer 120 submits the message 300A to its flow control request analyzer 210. The flow control request analyzer 210 of the remote peer 120 then communicates with the remote peer's flow control analyzer 209, which determines whether the request 300A can be accepted. Upon the flow control analyzer 209 making the determination of whether or not the request can be accepted, the remote peer 120 of the illustrated example sends a reply message 300B indicating whether the request 300A has been accepted.

In some examples, if the flow control request message 300A is accepted, the reply message 300B duplicates the contents of the request message 300A. Therefore, when the reply message 300B includes the same or similar contents as the request message 300A, the example reply message 300B indicates that the request 300A has been accepted, and subsequent flow control will be performed in accordance with the request 300A. In such examples, when the reply message 300B does not include the same or similar contents as the request message 300A, the request 300A has not been accepted, and subsequent flow control will continue as previously performed prior to message 300A being sent.

Upon receipt of example reply message 300B, the flow control request analyzer 210 of the requesting peer 110 determines whether the request message 300A has been accepted by the remote peer 120. If the request message 300A has been accepted, then the subsequent flow control mechanism used by the requesting peer 110 and the remote peer 120 for the existing communication session will be the mechanism that was requested in message 300A. The flow control monitor 208 of the requesting peer 110 then monitors flow control in accordance with the flow control mechanism identified in the request message 300A. If the request message 300A has not been accepted, then the subsequent flow control mechanism used by the requesting peer 110 and the remote peer 120 for the existing communication session continues to be the same mechanism that was used prior to sending request message 300A. The flow control monitor 208 of requesting peer 110 then monitors flow control using the flow control mechanism in place prior to submitting the request 300A.

Upon receipt of an example data message 404 from the requesting peer 110, the flow control monitor 208 and flow control analyzer 209 of the remote peer 120 may then either continue to transmit data using the flow control mechanism in accordance with the reply message 300B and/or analyze whether a further change to the flow control mechanism is desirable for the remote peer 120. Therefore, example message 405 of the communication session may be either a transmission of a data packet if the analyzer 209 of the remote peer 120 determines that there is no need to change the flow control, or a request from the remote peer 120 to the previously requesting peer 110 to change the flow control mechanism based on the findings of the flow control monitor 208 and the flow control analyzer 209 of the remote peer 120.

While an example manner of implementing the example flow controllers 116, 126, and 206 have been illustrated in FIGS. 1 and 2, one or more of the elements, processes and/or devices illustrated in FIGS. 1 and 2 may be combined, divided, re-arranged, omitted, eliminated and/or implemented in any other way. Further, the example flow control monitor 208, the example flow control analyzer 209, the example flow control request analyzer 210, the example flow control message generator 212, and/or, more generally, the example flow controllers 116, 126, and 206 of FIGS. 1 and 2 may be implemented by hardware, software, firmware and/or any combination of hardware, software and/or firmware. Thus, for example, any of the example flow control monitor 208, the example flow control analyzer 209, the example flow control request analyzer 210, the example flow control message generator 212, and/or, more generally, the example flow controller 206 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example flow control monitor 208, the example flow control analyzer 209, the example flow control request analyzer 210, the example flow control message generator 212, and/or, more generally, the example flow controllers 116, 126, and 206 are hereby expressly defined to include a computer readable storage medium such as a memory, DVD, CD, etc. storing the software and/or firmware. Further still, the example flow controllers 116, 126, and 206 may include one or more elements, processes and/or devices in addition to, or instead of, those illustrated in FIGS. 1 and 2, and/or may include more than one of any or all of the illustrated elements, processes and devices.

Figure 5:
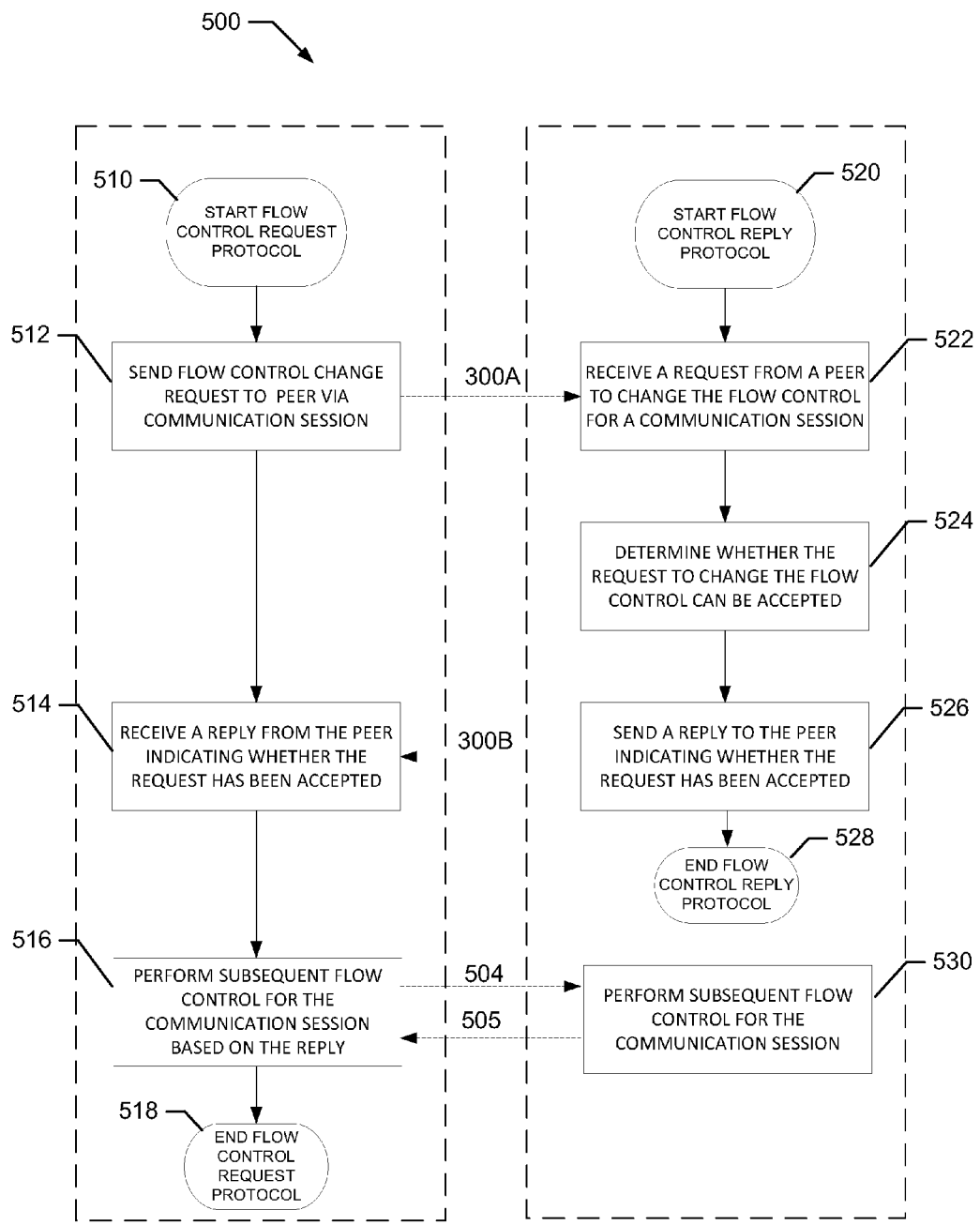
FIG. 5 is a flow chart representative of example machine readable instructions that may be executed to implement flow controllers, such as the example flow controller of FIG. 2, in the example peers of FIG. 1.
Figure 6:
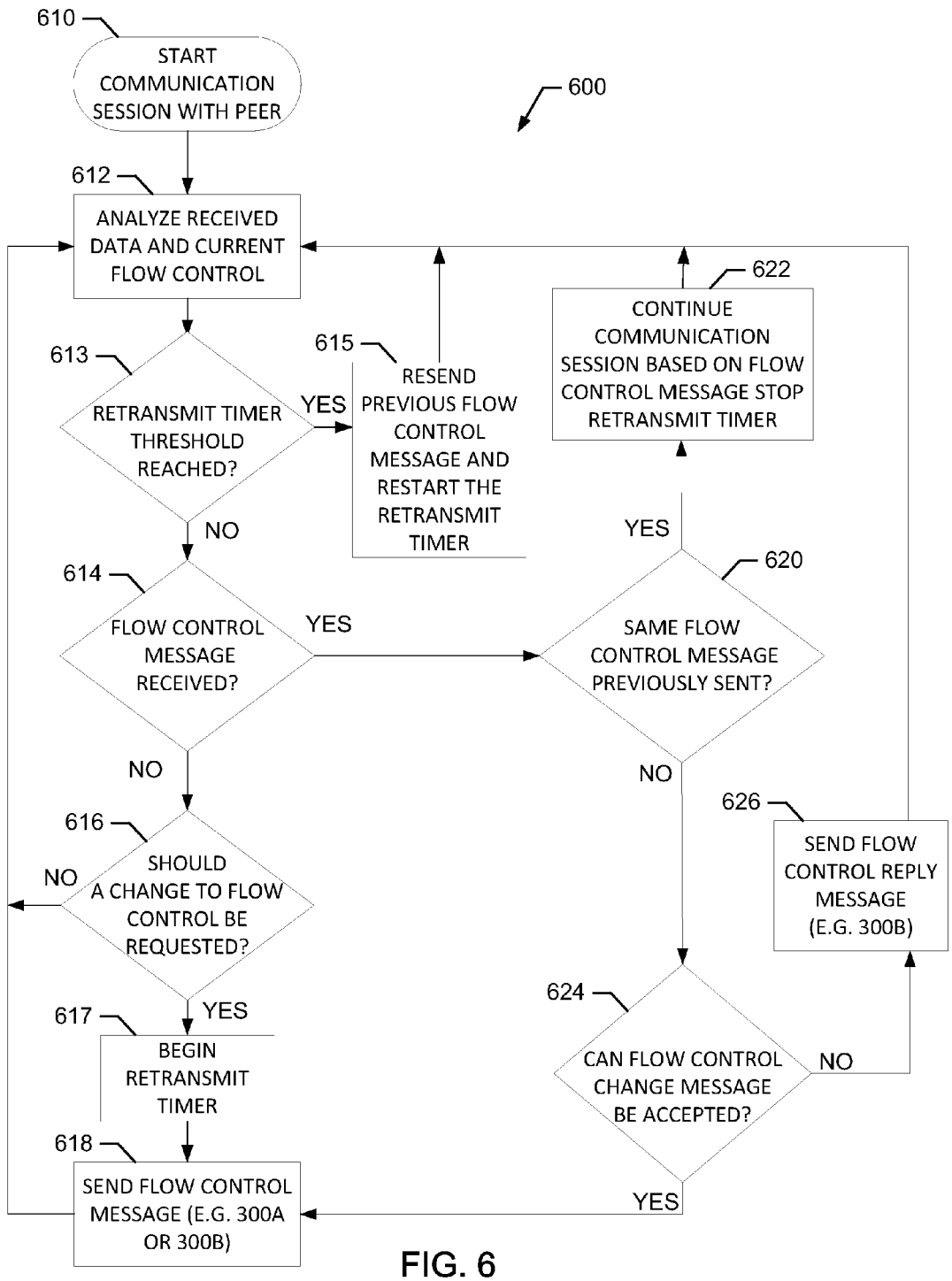
FIG. 6 is a flow chart representative of second example machine readable instructions that may be executed to implement the example flow controller of FIG. 2.

Flowcharts representative of example machine readable instructions for implementing the example flow controllers 116, 126, and 206, and in particular the example flow control monitor 208, the example flow control analyzer 209, the example flow control request analyzer 210, and/or the example flow control message generator 212, of FIGS. 1 and 2 is shown in FIGS. 5 and 6. In these examples, the machine readable instructions comprise one or more programs for execution by a processor, such as the processor 712 shown in the example computer 700 discussed below in connection with FIG. 7. The program may be embodied in software stored on a computer readable storage medium such as a CD-ROM, a floppy disk, a hard drive, a digital versatile disk (DVD), a Blu-ray Disc™, or a memory associated with the processor 712, but the entire program and/or parts thereof could alternatively be executed by a device other than the processor 712 and/or embodied in firmware or hardware. Further, although the example instructions are described with reference to the flowcharts illustrated in FIGS. 5 and 6, many other methods of implementing the example flow controllers 116, 126, and 206, and in particular the example flow control monitor 208, the example flow control analyzer 209, the example flow control request analyzer 210, and/or the example flow control message generator 212 may alternatively be used. For example, the order of execution of the blocks may be changed, and/or some of the blocks described may be changed, eliminated, or combined.

As mentioned above, the example processes of FIGS. 5 and 6 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a Blu-ray Disc™, a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage and to exclude propagating signals. Additionally or alternatively, the example processes of FIGS. 5 and 6 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable storage medium and to exclude propagating signals.

Example machine readable instructions 500 that may be executed to implement the respective example flow controllers 116, 126 of the peers 110, 120 of FIG. 1 are represented by the flow chart shown in FIG. 5. In the illustrated example of FIG. 5, the flow controllers 116, 126 of the respective peers 110, 120 are each assumed to be implemented by respective instances of the flow controller 206 of FIG. 2. With reference to the preceding figures and associated descriptions, the machine readable instructions 500 of FIG. 5, upon execution, cause the flow controller 116 of the requesting peer 110 to perform a flow control request protocol via a communication session at block 510 and the flow controller 126 of the remote peer 120 to start a flow control reply protocol via the communication session at block 520.

At block 510 of the illustrated example, the flow control monitor 208 and the flow control analyzer 209 of the requesting peer's flow controller 116 determine that a change in the flow control mechanism is desirable. At block 512 of the illustrated example, the flow control analyzer 209 of the requesting peer's flow controller 116 instructs its message generator 212 to generate a flow control change request message 300A. The requesting peer's flow controller 116 also sends the request message 300A to the remote peer 120 and stores the request in its memory 214. In some examples, the flow control monitor 208 of the requesting peer's flow controller 116 begins a retransmit timer to ensure that a reply is received. If the reply is not received after a threshold period of time, the request 300A is resent to the remote peer 120. Line 300A of FIG. 5 represents the request message 300A being sent via the communication session from the requesting peer's flow controller 116 to the remote peer's flow controller 126.

Upon receiving the request message 300A, the remote peer's flow controller 126 starts a flow control reply protocol at block 520 of the illustrated example. At block 520, the flow control monitor 208 of the remote peer's flow controller 126 recognizes a flow control change request message 300A being received from the requesting peer 110, and forwards the request 300A to its flow control analyzer 209. At block 522 of the illustrated example, the remote peer's flow controller 126 receives the request message 300A in the flow control request analyzer 210. At block 524 of the illustrated example the flow control request analyzer 210 of the remote peer's flow controller 126 determines whether the flow control change request 300A can be accepted, as described above. At block 526 of the illustrated example, the flow control analyzer 209 of the remote peer's flow controller 126 instructs its message generator 212 to generate a reply message 300B indicating whether the request has been accepted, and the remote peer's flow controller 126 sends the reply message 300B via the communication session to requesting peer 110. Line 300B represents a reply message 300B being sent via the communication session from the remote peer's flow controller 126 to the requesting peer 110. The reply message 300B may have the same format and/or content as the request message 300A. Following transmission of the reply message 300B, at block 528 of the illustrated example, the remote peer's flow controller 126 ends the flow control reply protocol and performs subsequent flow control in accordance with the reply message 300B.

At block 514 of the illustrated example, the flow control monitor 208 of the requesting peer's flow controller 116 detects a reply message 300B from the remote peer 120 and forwards the reply message 300B to its flow control request analyzer 210. In some examples, the requesting peer's flow control monitor 208 also resets, stops, or pauses the retransmit timer if the reply message 300B is a reply to the previous request message 300A, which prevents retransmission of a request message having the same contents as request message 300A. At block 516 of the illustrated example, in the requesting peer's flow controller 116, the flow control request analyzer 210 communicates with the memory 214 and the flow control analyzer 209 to determine whether the request message 300A has been accepted. In some examples, the flow control request analyzer 210 communicates with the memory 214 to determine if the contents of message 300B include the same or similar contents of the prior request message 300A. In some examples, if the contents of the message 300B include the same or similar contents as the previous request message 300A, then the request message 300A is determined to have been accepted. In other examples, if the contents of the prior request message 300A do not include the same or similar contents as the received message 300B, then the reply message 300B may indicate that the request of message 300A has not been accepted. In some examples, if the request 300A has been accepted, the flow control request analyzer 210 of the requesting peer's flow controller 116 instructs the flow control monitor 208 to change the flow control type (e.g. sliding window, NACK, stream, etc.) and/or flow control parameters used to monitor flow control to correspond to the requested flow control change of the request message 300A. If the request has not been accepted, the flow control request analyzer 210 instructs the flow control monitor 208 to continue flow control using the flow control type and parameters in place prior to sending the request message 300A. Finally, at block 516 of the illustrated example, flow controller 116 may continue to transmit data messages 504 using flow control in accordance with the reply message 300B. In the example of FIG. 5, line 504 represents data messages being sent from the requesting peer 110 to the remote peer 120 using the existing communication session and using a flow control mechanism (e.g. flow control type and parameters) according to the reply message 300B. Following transmission of message 504, at block 520 of the illustrated example, the requesting peer's flow controller 116 ends the flow control request protocol.

At block 530 of the illustrated example, the remote peer's flow controller 126 may continue to receive data via the existing communication session and using flow control mechanism in accordance with the reply message 300B. Sometime later, flow control monitor 208 and flow control analyzer 209 of the remote peer's flow controller 126 may determine that a change to the flow control mechanism should be made. If a change is found to be desirable, remote peer's flow controller 126 sends a flow control change request message (e.g. a message similar to message 300A). If the remote peer's flow controller 126 does not desire a change to the flow control mechanism, the remote peer's flow controller 126 continues to transmit data messages using the flow control mechanism (e.g. flow control type and parameters) in accordance with the reply message 300B. Thus, line 505 in FIG. 5 represents either a flow control change request or data messages sent from the remote peer 120 to the requesting peer 110 depending on whether the remote peer's flow controller 126 requests a change to the flow control mechanism.

Example machine readable instructions 600 that may be executed to implement the example flow controller 206 of FIG. 2 are represented by the flowchart shown in FIG. 6. With reference to the preceding figures and associated descriptions, the machine readable instructions 600 of FIG. 6, begin execution at block 610 to cause the example flow controller 206 to communicate with a remote peer via a communication session to perform flow control negotiation as a requestor and/or receiver of flow control messages as appropriate. At block 612 of the illustrated example, the flow control monitor 208 of the flow controller 206 analyzes received packet data and/or messages and monitors the flow control under a current flow control mechanism (e.g. specifically a current type of flow control such as sliding window, NACK, stream, etc., and/or certain flow control parameters of the current type). At block 613 of the illustrated example, the flow control monitor 208 determines whether a retransmit timer threshold for a pending flow control request message (e.g. such as the message 300A) has been reached. Assuming that there is no pending flow control request message, the retransmit timer will not be running and therefore a threshold will not be reached, sending control to block 614. At block 614 of the illustrated example, the flow control monitor 208 may identify flow control messages (e.g. such as the message 300A) received via the communication session.

If a flow control message is not received, at block 616 of the illustrated example, the flow control monitor 208 monitors the data flow for loss of packets or data (e.g. corresponding to actual packet loss, delay, etc.). If the flow control monitor 208 determines that no data has been lost or delayed and/or that a flow control request message (e.g. such as the message 300A) is pending, then the flow controller 206 continues to control the data flow at block 612 using the flow control mechanism in place upon receipt of the previous set of data at block 612. However, if the flow control monitor 208 determines that there has been a loss of data, or data has not been received as expected (e.g. there is a delay), at block 616 of the illustrated example the flow control monitor 208 instructs the flow control analyzer 209 of the flow controller 206 to determine which of the available flow control mechanisms (e.g. type of flow control and/or parameters associated with the flow control type) should be implemented. For example, the control analyzer 209 may determine that the control mechanism should be changed from a sliding window to a stream based on the present network environment. If the flow control analyzer 209 determines that a change to the flow control is desirable, at block 617, the flow control monitor 208 begins a retransmit timer to track whether a response to a flow control request messaged transmitted at block 618 has been received. At block 618 the flow control analyzer 209 instructs the message generator 212 to generate a change flow control request message (e.g. the message 300A). The example flow controller 206 then sends the flow control request message 300A to the remote peer via the communication session and, in some examples, stores a copy of the request in the memory 214. From there, back at block 612 of the illustrated example, the flow control monitor 208 awaits a response to the request message using the retransmit timer. Back at block 613, if a certain threshold period of time has elapsed before receiving a response, at block 615 the flow control monitor 208 instructs the message generator 212 to retransmit the previous flow control change request 300A and reset the retransmit timer. Control then returns to block 612. The flow controller 206 may or may not permit its own peer to continue to receive data during the above period of time depending on the characteristics of the network environment, throughput, etc.

Going back to block 614 of the illustrated example, in some examples if a flow control message is received at the flow control monitor 208, the flow control monitor 208 forwards the message to the flow control request analyzer 210 of the flow controller 206 to determine whether the request can be accepted at block 624. If the request is not accepted, the flow control request analyzer 210 and the flow control analyzer 209 instruct the flow control monitor 208 to use an example flow control mechanism identified in the request (e.g. as identified in the flow control mechanism identifier 304A). In such examples, at block 622 of the illustrated example, the flow control monitor 208 commences data communications using the flow control mechanism identified in the request message 300A. If the request cannot be accepted, at block 618 of the illustrated example, the flow control request analyzer 210 and the flow control analyzer 209 instruct the message generator 212 to send a reply (e.g. 300B) indicating that the request has not been accepted, and the communication session continues using the same flow control mechanism that was in place prior to receiving the flow control request message at block 612.

In some examples, the flow control request analyzer 210 may crosscheck the flow control message 300A with the flow control memory 214 (block 620). If flow control request analyzer 210 determines that the flow control memory 214 is storing a prior flow control request message including the same or similar contents as the present flow control message 300A (block 620), then flow control message 300A is considered a reply message (e.g. 300B). In such examples, at block 622 of the illustrated example, the flow control request analyzer 210 informs the flow control monitor 208 to change the flow control mechanism in accordance with the flow control message 300B. In some examples, the flow control reply message 300B may have the same sequence number 306B and request identification 308B but a separate flow control mechanism identifier 304B from the flow control message stored in memory 214. In such examples, the reply 300B may indicate that the request has not been accepted and the flow control monitor 208 stops, pauses, or resets a retransmit timer and, at block 622 of the illustrated example, continues performing flow control of the data in accordance with the reply 300B. In some examples, if the reply message has the same or similar contents with regard to the flow control mechanism identifier 304B, as well as sequence number 306B and request identification 308B, the reply message 300B indicates that the message stored in memory 214, which was previously transmitted, has been accepted. In such examples the flow control monitor 208 stops, pauses, or resets a retransmit timer and, at block 622 of the illustrated example, continues performing flow control of the data in accordance with the reply 300B and/or the message stored in memory 214.

If the flow control memory 214 is not storing a request message with the same or similar contents as the present flow control message 300A (block 620), then the flow control request analyzer 210 instructs the flow control analyzer 209 to determine whether or not such a request can be accepted (block 624). The flow control analyzer 209 then determines if the flow control mechanism 304A identified in the request message 300A is acceptable, considering any number of factors, such as network environment, throughput, projected data flow for each mechanism (e.g. flow control type and/or respective parameters). If the flow control analyzer 209 determines that the request is acceptable (block 624), then the flow control analyzer 209 instructs the message generator 212 to generate a flow control reply message 300B comprising the same contents as received request (block 618). The flow controller 206 then sends the request. In some examples, if the flow control analyzer 209 determines that the request 300A is not accepted, then the flow control analyzer 209 instructs the message generator 212 to generate a reply flow control change message 300B identifying the flow control mechanism in use prior to receiving the request message and having the same sequence number and request identification as the request message (block 626). The flow controller 206 then transmits the message 300B, and control returns to block 612 such that the flow control monitor 208 continues to control the data flow using the flow control mechanism in use prior to receiving the request message at block 612.

Figure 7:
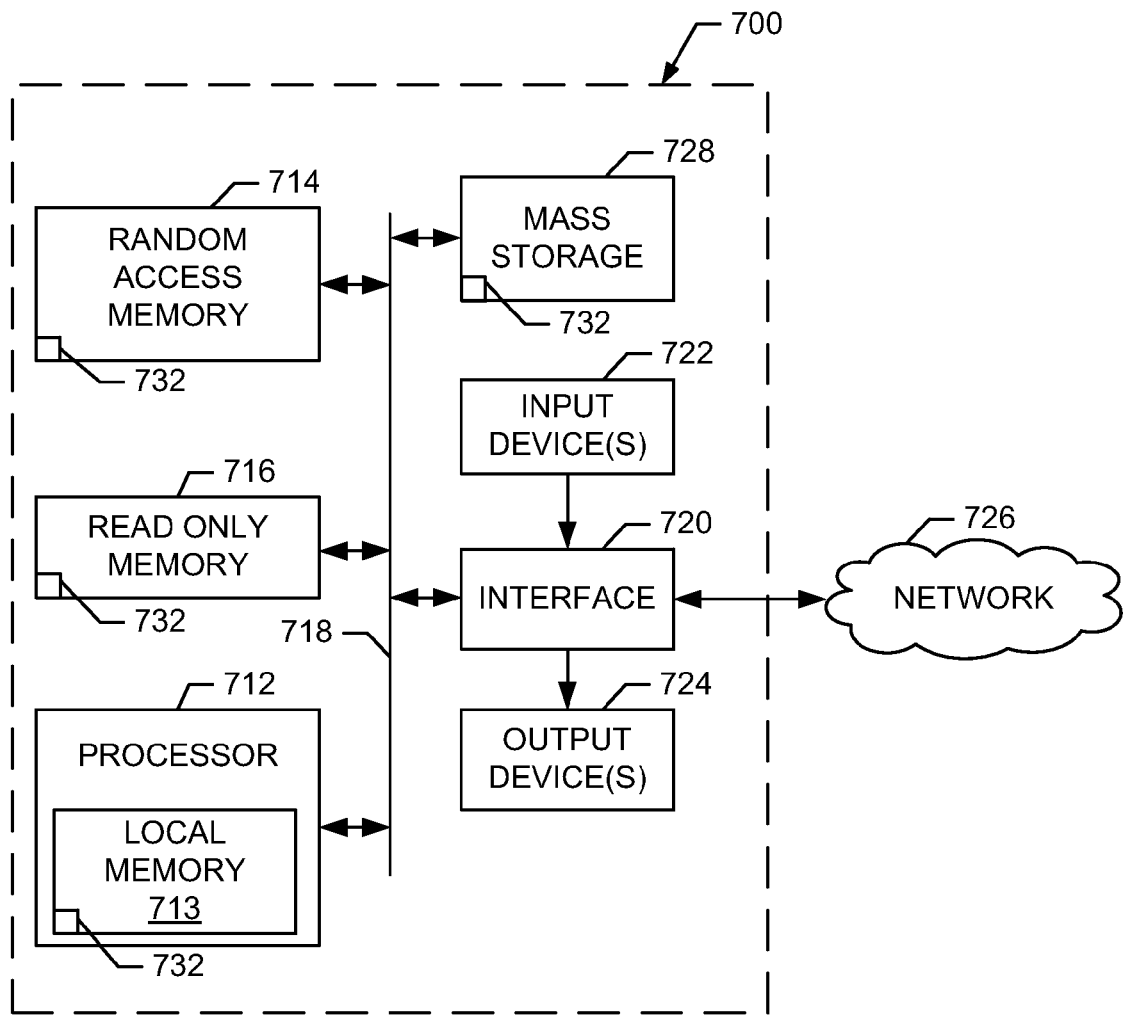
FIG. 7 is a block diagram of an example processor platform to execute the instructions of FIGS. 5 and/or 6 to implement the example flow controller of FIG. 2 and/or one or more of the example peers of FIG. 1.

FIG. 7 is a block diagram of an example computer 700 capable of executing the instructions of FIGS. 5 and 6 to implement the flow controllers 116, 126, and/or 206 of FIGS. 1 and 2, and/or the peer devices 110, 120, and 200 of FIGS. 1 and 2. The computer 700 can be, for example, a server, a personal computer, a mobile phone (e.g., a cell phone), a personal digital assistant (PDA), an Internet appliance, a DVD player, a CD player, a digital video recorder, a personal video recorder, a set top box, or any other type of computing device.

The system 700 of the instant example includes a processor 712. For example, the processor 712 can be implemented by one or more Intel® microprocessors from the Pentium® family, the Itanium® family or the XScale® family. Of course, other processors from other families are also appropriate.

The processor 712 is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is typically controlled by a memory controller (not shown).

The computer 700 also includes an interface circuit 720. The interface circuit 720 may be implemented by any type of interface standard, such as an Ethernet interface, a universal serial bus (USB), and/or a PCI express interface.

One or more input devices 722 are connected to the interface circuit 720. The input device(s) 722 permit a user to enter data and commands into the processor 712. The input device(s) can be implemented by, for example, a keyboard, a mouse, a touchscreen, a track-pad, a trackball, isopoint and/or a voice recognition system.

One or more output devices 724 are also connected to the interface circuit 720. The output devices 724 can be implemented, for example, by display devices (e.g., a liquid crystal display, a cathode ray tube display (CRT), a printer and/or speakers). The interface circuit 720, thus, typically includes a graphics driver card.

The interface circuit 720 also includes a communication device (e.g., transceivers 114, 124, and 224) such as a modem or network interface card to facilitate exchange of data with external computers via a network 726 (e.g., an Ethernet connection, a digital subscriber line (DSL), a telephone line, coaxial cable, a cellular telephone system, etc.). Network 102 can be implemented by network 726.

The computer 700 also includes one or more mass storage devices 728 for storing software and data. Examples of such mass storage devices 728 include floppy disk drives, hard drive disks, compact disk drives and digital versatile disk (DVD) drives. The mass storage device 728 may implement the flow controller memory 214.

The coded instructions of FIGS. 5 and 6 may be stored in the mass storage device 728, in the volatile memory 714, in the non-volatile memory 716, and/or on a removable storage medium such as a CD or DVD At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method to negotiate flow control, the method comprising:

using, at a first peer, a first type of flow control to control the flow of data at the first peer for an existing communication session between the first peer and a second peer;

sending, via the existing communication session, a request from the first peer to the second peer to change from the first type of flow control to a second type of flow control for the existing communication session;

receiving at the first peer, via the existing communication session, a reply from the second peer, the reply indicating the request to change from the first type of flow control to the second type of flow control for the existing communication session has been accepted; and in response to the reply from the second peer, using, at the first peer, the second type of flow control to control the flow of data at the first peer for the existing communication session.

2. The method of claim 1, wherein the request includes a first message including a flow control identifier, a sequence number identifying a last valid sequence number of data transmitted via the existing communication session, and a request identification, the flow control identifier identifying the second type of flow control.

3. The method of claim 2, wherein the reply includes a second message including the flow control identifier, the sequence number, and the request identification.

4. The method of claim 1, wherein the request is a first message including a flow control identifier, a sequence number, and a request identification, and the reply is a second message including the flow control identifier, the sequence number, and the request identification, the flow control identifier identifying the second type of flow control.

5. The method of claim 1, further including crosschecking a first contents of the reply with a second contents of the request.

6. A first peer comprising:

memory including machine readable instructions; and a processor to execute the instructions to perform operations including:

using a first type of flow control to control a flow of data at the first peer for an on-going communication session with a second peer;

sending, via the on-going communication session, a request to the second peer to change the flow control for the on-going communication session from the first type of flow control to a second type of flow control;

receiving, via the on-going communication session, a reply from the second peer, the reply indicating the request to change the flow control for the on-going communication session has been accepted; and based on the reply, using the second type of flow control to control the flow of data at the first peer for the on-going communication session with the second peer.

7. The first peer of claim 6, wherein the request includes a first message including a requested flow control identifier identifying the second type of flow control, a sequence number identifying a last valid sequence number of data transmitted via the on-going communication session, and a request identification.

8. The first peer of claim 7, wherein the reply includes a second message including the requested flow control identifier, the sequence number, and the request identification.

9. The first peer of claim 6, wherein the operations further include crosschecking a first contents of the reply with a second contents of the request.

10. A tangible machine readable storage medium including instructions which, when executed, cause a first peer to perform operations comprising:

using a first type of flow control to control a flow of data at the first peer during an on-going communication session with a second peer;

sending, via the on-going communication session, a request to the second peer to change a flow control from a first type of flow control to a second type of flow control for the on-going communication session; and using a second type of flow control to control the flow of data at the first peer for the on-going communication session based on a reply received from the second peer via the on-going communication session, the reply indicating the request to change the flow control for the on-going communication session has been accepted.

11. The storage medium of claim 10, wherein the request includes a requested flow control identifier, a sequence number identifying a last valid sequence number of data transmitted via the on-going communication session, and a request identification, the requested flow control identifier identifying the second type of flow control.

12. The storage medium of claim 10, wherein the operations further include crosschecking a first contents of the reply with a second contents of the request.

13. The method of claim 1, wherein the second type of flow control is an asymmetric type of flow control.

14. The first peer of claim 6, wherein the second type of flow control is an asymmetric type of flow control.

15. The storage medium of claim 10, wherein the second type of flow control for the on-going communication session is an asymmetric type of flow control.

16. The method of claim 1, wherein the reply includes a first flow control identifier that matches a second flow control identifier included in the request.

17. The first peer of claim 6, wherein the reply includes a first flow control identifier that matches a second flow control identifier included in the request.

18. The storage medium of claim 10, wherein the reply includes a first flow control identifier that matches a second flow control identifier included in the request.

19. The method of claim 1, further including, in response to the request, using, at the second peer, the second type of flow control to control the flow of data at the second peer.

\* \* \* \* \*